United States Patent [19]
DeKraker

[11] Patent Number: 5,221,460
[45] Date of Patent: Jun. 22, 1993

[54] CONTINUOUS AUTOREFRIGERATIVE DEWAXING CRYSTALLIZATION USING A CENTRIFUGE

[75] Inventor: Abraham R. DeKraker, Sarnia, Canada

[73] Assignee: Exxon Research & Engineering Company, Florham Park, N.J.

[21] Appl. No.: 704,145

[22] Filed: May 22, 1991

[51] Int. Cl.$^5$ .................. C10G 73/06; B04B 11/02
[52] U.S. Cl. ........................... 208/35; 196/14.5; 494/52; 494/65; 494/67; 494/68
[58] Field of Search ............. 208/35; 196/14.5; 494/52, 53, 65, 67, 68

[56] References Cited

U.S. PATENT DOCUMENTS

| | | | |
|---|---|---|---|
| 2,113,809 | 4/1938 | Lincoln | 196/14.5 |
| 2,119,749 | 6/1938 | Merrill | 208/35 |
| 3,159,563 | 12/1964 | Anastasoff et al. | 196/14.5 |
| 3,534,903 | 10/1976 | Keith | 233/14 |
| 3,654,128 | 4/1972 | Woodle | 208/33 |
| 3,670,888 | 6/1972 | Boroughs et al. | 210/71 |
| 3,682,812 | 8/1972 | Streets et al. | 208/38 |
| 3,684,685 | 8/1972 | Herbstman | 208/37 |
| 3,684,686 | 8/1972 | Herbstman et al. | 208/37 |
| 3,806,442 | 4/1974 | Reid et al. | 208/33 |
| 4,477,333 | 10/1984 | Hafez | 208/30 |

FOREIGN PATENT DOCUMENTS 110651  6/1984  European Pat. Off. .

Primary Examiner—Olik Chaudhuri
Assistant Examiner—P. L. Hailey
Attorney, Agent, or Firm—Joseph J. Allocca

[57] ABSTRACT

Hydrocarbon dewaxing using propane or other autorefrigerative dewaxing solvent can be practiced in a centrifuge wherein the centrifugal force generated in the centrifuge produces a pressure gradient permitting dewaxing to be practiced on a continuous basis.

10 Claims, 2 Drawing Sheets

CONTINUOUS AUTOREFRIGERATIVE DEWAXING CRYSTALLIZATION USING A CENTRIFUGE

FIELD OF THE INVENTION

This invention relates to the continuous autorefrigerative dewaxing of waxy hydrocarbons by use of a centrifuge.

Waxy liquid hydrocarbons can be dewaxed employing autorefrigerative dewaxing solvents such as $C_2-C_4$ aliphatic hydrocarbon solvents, preferably propane, propylene, butane, butylene, and mixtures thereof, by using a centrifuge as the dewaxing containment vessel. The centrifugal force generated by the rotation of the centrifuge creates a pressure gradient that permits the dewaxing solvent in the dewaxing solvent-waxy oil solution to gradually vaporize on a continuous basis thereby cooling the solution by autorefrigeration, resulting in the crystallization of wax from the hydrocarbon. This dewaxing occurs continuously rather than in batches as is currently practiced in the art of autorefrigerative dewaxing.

A waxy hydrocarbon is mixed with liquified autorefrigerative solvent to produce a hydrocarbon feed-/autorefrigerative solvent solution that is then introduced at the centrifuge's wall, the location of highest pressure and moves radially inward toward the centrifuge's axis, the location of lowest pressure. The existence of this pressure gradient allows the solvent to vaporize thereby cooling the solution which crystallizes the wax. The vaporized autorefrigerative solvent is removed from the center of the centrifuge, recovered, repressurized, mixed with fresh waxy feed, and re-introduced to the centrifuge. The liquid dewaxed hydrocarbon and crystallized wax slurry is removed from the centrifuge over a weir. The entire operation is continuous thereby avoiding the disadvantages of conventional batch chiller operation.

BACKGROUND OF THE INVENTION

Waxy hydrocarbon oils are dewaxed so as to improve their usefulness in any number of applications. Dewaxed oils exhibit reduced cloud and pour points making them useful as liquid lubricants which can operate at low temperature without solidification.

The waxy hydrocarbon oils can be dewaxed in any number of ways.

The waxy oil can simply be chilled to crystallize out the wax and filtered to recover dewaxed oil and a wax product. Low to moderate pour point reductions can be achieved by this technique.

In order to achieve significant pour-point reductions, dewaxing using various solvents has been practiced. Thus waxy hydrocarbon oils can be dewaxed using ketone solvents, such as methyl ethyl ketone, methyl isobutyl ketone, and mixtures thereof; and mixtures of ketones with aromatic hydrocarbons, such as MEK/-Toluene. Autorefrigerative solvents such as propane, propylene, butane, butylene, and mixtures thereof can also be used.

Autorefrigerative solvents have been used in batch operation, usually involving two pressure vessels running in alternate sequence.

Autorefrigerative solvent dewaxing involves feeding into a pressure vessel a solution of waxy hydrocarbon oil and solvent under pressure at elevated temperature. The pressure is then slowly reduced permitting the vaporization of the autorefrigeration solvent and resulting in cooling the solution. This cooling causes the wax present in the hydrocarbon oil to crystallize. At completion of the process the slurry of hydrocarbon oil and wax crystals is removed from the vessel and sent to liquid-solid separation means such as filters or a centrifuge wherein the solid wax and oil are separated and recovered as independent streams. The vaporized propane is recovered, repressurized, and mixed with a fresh portion of waxy hydrocarbon oil to produce a charge solution; the solution is then charged to a dewaxing pressure vessel that has been permitted to warm up since the last round of dewaxing.

In order to operate most efficiently, multiple vessels are used and are operated under alternating, batch conditions. Thus, while one vessel is being charged, depressurized - cooled, and emptied, a second vessel that had just previously completed its refrigeration sequence is permitted to warm up before being recharged. In this way a relatively continuous stream of dewaxed oil can be produced in a process otherwise characterized by blocked sequence operation.

This blocked sequence, batch operation has a number of disadvantages.

Operation of the down stream liquid-solid separators, be they filters or centrifuges, cannot be maximized or made most efficient when feed for those separators is fed to them on an intermittent rather than on a smooth, continuous basis.

Batch chilling pressure vessels are fitted with numerous valves that must be maintained and carefully controlled in order to smoothly reduce the pressure on the solvent to achieve controlled chilling and uniform wax particle size, without bumping or boiling of the solvent which can be extremely detrimental to the eventual liquid-solid separation step and dewaxed oil yield.

Because batch chillers must be warmed before oil-solvent introduction and chilling, large amounts of energy are wasted in this temperature cycling.

It would be an advantage if autorefrigerative solvent waxy oil dewaxing could be practiced on a continuous basis avoiding (1) intermittent vessel warm-up, (2) large numbers of control valves, and (3) intermittent flow of oil/crystallized wax to the liquid-solid separation means.

DETAILED DESCRIPTION OF THE INVENTION

Figure 1:
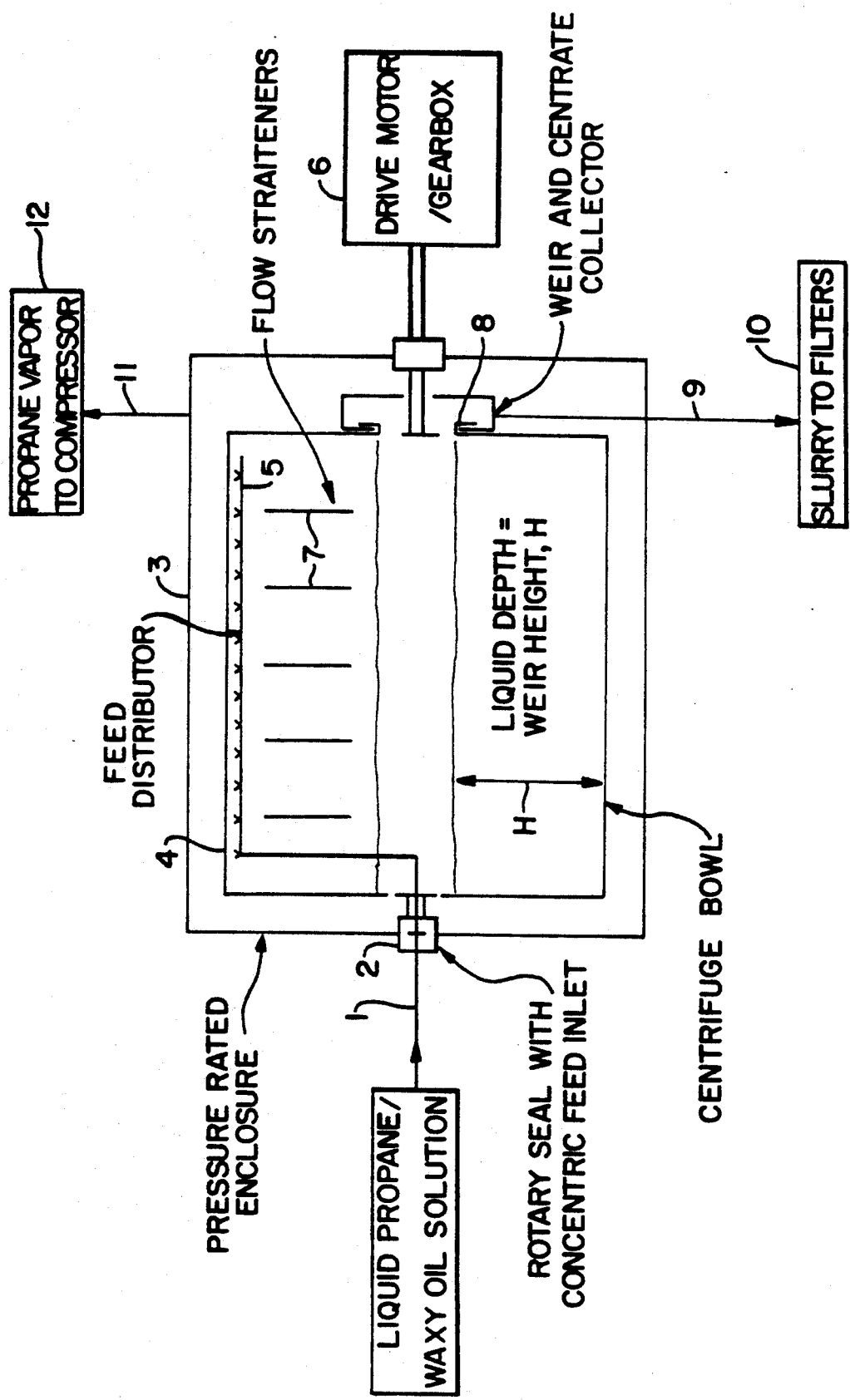
FIG. 1 is a schematic of an embodiment of a continuous autorefrigerative centrifugal chiller.

Autorefrigerative solvent waxy hydrocarbon oil dewaxing can be practiced on a continuous basis by using a centrifuge as the dewaxing vessel.

Any waxy hydrocarbon oil can be dewaxed by this process. Waxy hydrocarbons oil are preferably waxy petroleum oils. Preferred oils are lubricating oils and specialty oils, refrigerator oils, transmission oils, insulating oils, turbine oils, white oils, etc.

Waxy hydrocarbon oil is mixed with hot, liquid, pressurized autorefrigerative dewaxing solvent, ($C_2-C_4$ aliphatic hydrocarbons) such as ethane, propane, propylene, butane, butylene and mixtures thereof, preferably propane, propylene, butane, butylene and mixtures thereof, most preferably propane and butane and mixtures thereof. Sufficient autorefrigerative solvent is added to waxy oil to completely dissolve all the wax in the feed. A dilution ratio of about 1-5 volumes solvent per volume waxy hydrocarbon feed, preferably about 2-4 volumes of solvent per volume of waxy hydrocarbon feed is typically used. The hot solution of waxy oil and solvent typically at about 10 to 40° C. is introduced, under pressure, into a pressure rated centrifuge. The solution is distributed at the interior wall of the rotating centrifuge bowl where, centrifugal forces maintain an elevated pressure. The pressure at the wall is just high enough to prevent vaporization of the autorefrigerative dewaxing solvent in the solution.

As the solution migrates from the centrifuge bowl wall to the center axis of the centrifuge in response to the continuous addition of solution to the centrifuge bowl at the wall, the pressure on the solution is gradually reduced. In response to this gradual pressure reduction as the solution moves further away from the centrifuge bowl wall (i.e., pressure gradient with high pressure at wall and lower pressure at centrifuge axis), the autorefrigerative solvent vaporizes and thereby cools the solution, resulting in crystallization of the wax in the solution.

Vaporized autorefrigerative solvent is recovered from near the center of the centrifuge, repressurized, liquified, mixed with fresh waxy oil feed to produce the waxy oil/solvent solution, and reintroduced into the centrifuge at the wall of the bowl.

The dewaxed oil/solidified wax slurry generated during solvent vaporization as the solution moves from the centrifuge wall to its axis is prevented from uncontrollably escaping from the centrifuge by a weir located at the mouth of the centrifuge. When the slurry has attained the desired composition, near the center of the centrifuge, it spills over the weir, is collected, and sent to liquid-solid separation-means such as a rotary filter, or centrifuge for the recovery of separate streams of dewaxed oil and solid wax. The height of this overflow weir can be established once the density of the solvent-oil solution actually to be used has been determined and the desired pressure drop for that solution has been fixed by use to the formula $$\frac{2(P - P_o)}{\rho} = w^2 (R^2 - (R - h)^2)$$

where $P$=pressure at the centrifuge wall, $P_o$=pressure at the center of the centrifuge near the axis of rotation such that $(P - P_o)$=the overall $\Delta p$ on the solution in the centrifuge, $\rho$=solution density, $w$=rotational speed, $R$=centrifuge bowl radius and $h$=weir height.

This equation can have inserted into it the variables of $P$, $P_o$ and $\rho$ set by the practitioner for his particular system of solvent and oil and then it can be used to solve for either rotational speed or weir height.

Figure 2:
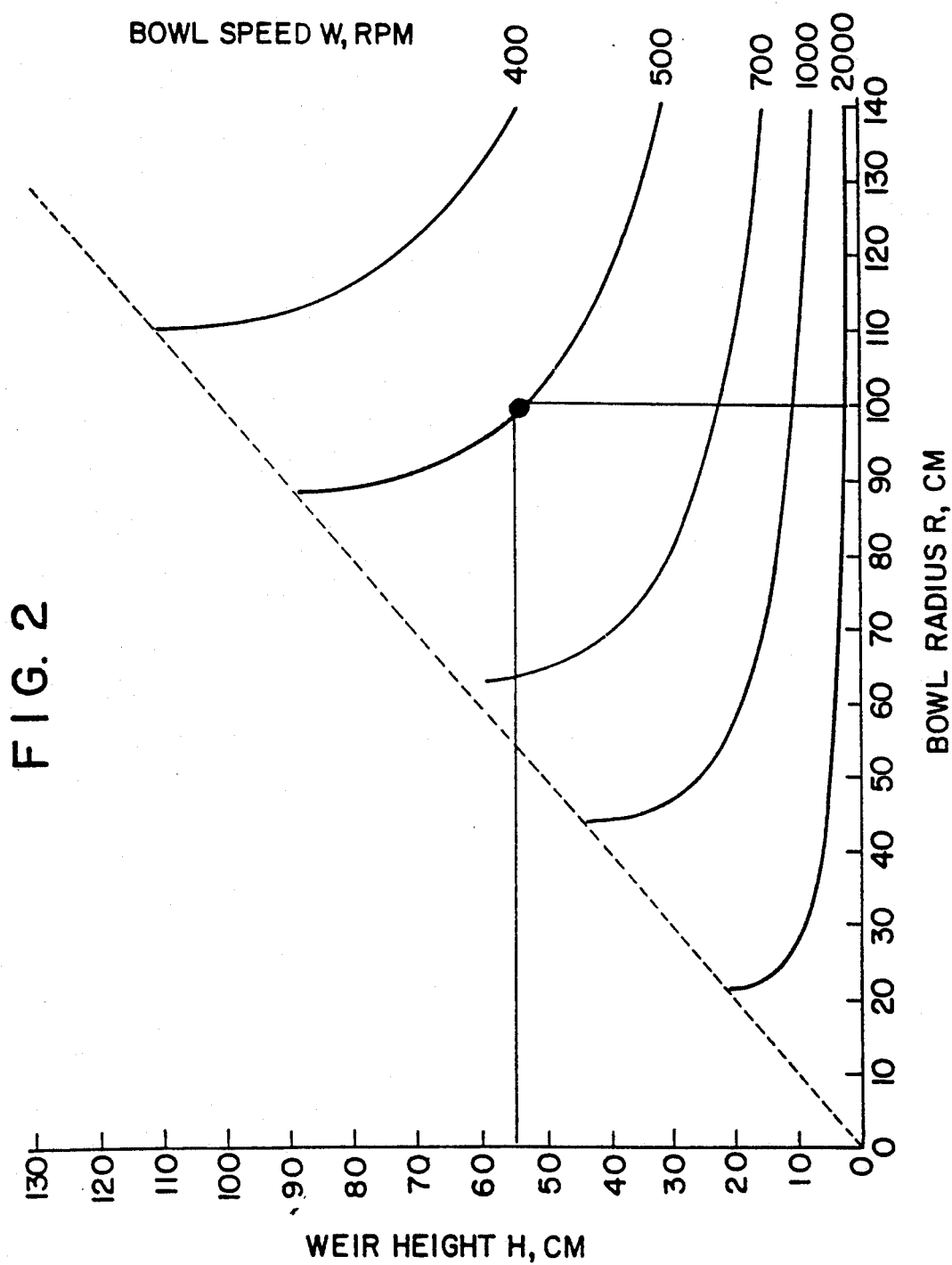
FIG. 2 is a graphical representation of the relationship between centrifuge bowl radius, weir height and rotational speed for a waxy oil/solvent solution of 0.65 density and a pressure drop of 100 psi.

For example, FIG. 2 shows the curve plots generated for various rotational speeds and centrifuge bowl diameter that can be used to determine weir height. To generate those curves it was assumed that P was 100 psig (900×10³ kg/ms²), $P_o$ was 0 psig (100×10³ kg/ms²), and solution density for a propane solvent waxy oil solution was 650 kg/m³.

Inserting these set variables into the equation and using compatible units of measure the equation is solved and becomes $$w^2 (R^2 - (R - h)^2 = 1.936 \times 10^9 \; RPM^2 \; cm^2$$

for the assumed system, where RPM is revolutions per minute.

Upon insertion into this equation of the different rotational speeds and bowl radii, the curves shown in FIG. 2 are generated which can be used to establish the weir height of the centrifuge for the above assumed system for different centrifuge bowl radii and rotational speeds.

Alternatively when weir height and centrifuge bowl radii are non-variable constants (as in the case when pre existing hardware is used) the formula can be employed to establish the rotational speed needed to produce the desired $\Delta P$ in a solution of known density.

The centrifuge can also be fitted with an internal flow distribution baffle-means such as centerless discs hereinafter and in the claims called "internal weirs", attached to the interior bowl wall and extending radially from the wall toward the center of the centrifuge to prevent back flow and undesired mixing of the solution in the centrifuge bowl as it migrates from the wall of the bowl to the center of the centrifuge near the axis. These internal weirs are of shorter height than the final overflow weir of the centrifuge.

In response to the different grades of oil that can be dewaxed, the rate of chilling in the centrifuge can be controlled by selection of different autorefrigerative dewaxing solvents, by controlling the rotational speed of the centrifuge, and by adjusting the height of the weir in the centrifuge.

Higher rotational speed translates into higher initial pressures. Greater liquid depths or weir heights correspond to greater degrees of dewaxing in response to the larger pressure gradient.

Centrifuge speeds can range from about 100 to 2000 rpm. Centrifuge bowl diameters can range from 10 to 1000 cm. Greater diameters translate into greater liquid depths and larger pressure gradients that correspond to greater degrees of dewaxing.

If desired, a number of centrifuges can be used in series with the overflow from over the weir of the first or preceding centrifuge serving as the feed to a second or next succeeding centrifuge with or without the addition of more autorefrigerative solvent, with the overflow over the weir of the second or next succeeding centrifuge going to liquid—solid separation means or being used as feed to a third or still another succeeding centrifuge, etc.

Any number of centrifuges in series can be employed to achieve the desired final dewaxed oil composition, dewaxed oil pour point, wax composition etc.

By their very nature of operation centrifuges can also simultaneously physically separate the crystallized wax from the dewaxed oil, functioning as a liquid-solid separation means in addition to serving as the wax crystallizer.

Operation conditions of the centrifuge as the wax crystallizes would preferably be adjusted to achieve a chilling rate of about 1 to 5° C./minute, with minimal turbulence or back mixing of the oil/solvent solution-slurry. When using propane as the autorefrigerative solvent, the centrifuge bowl will preferably be about 200 cm in diameter and the centrifuge rotational speed will be about 500 rpm.

DETAILED DESCRIPTION OF THE PREFERRED EMBODIMENTS

The mode of operation the invention is diagrammed in FIG. 1.

A solution of waxy oil/pressurized liquid autorefrigeration solvent (in this case identified as liquid propane) is fed via line (1) through rotary seal (2) into the interior of centrifuge (3). The feed solution is distributed at the interior wall (4) of the centrifuge through a feed solution distributor-means (5). The centrifuge is rotated by motor/gearbox (6). Flow distribution baffles (7) are fitted into the interior of the centrifuge. These centerless discs prevent back mixing of the solution. As feed solution is introduced into the bowl the liquid height (H) of the solution increases. With increasing distance from the interior wall (4) of the centrifuge the pressure on the solution is reduced. The propane in the solution responds to the pressure reduction by vaporizing, thereby chilling the solution and causing wax to crystallize, producing a slurry of crystallized wax and dewaxed oil. A weir (8) prevents uncontrolled escape of the solution from the centrifuge. As additional solution is introduced into the centrifuge bowl, the liquid depth (H) becomes great enough for the slurry of crystallized wax and dewaxed oil to spill over the weir. The slurry which spills over the weir can be sent via line (9) to the liquid/solid separation means (10), identified as a slurry filter. Propane vapor is recovered via line (11) and sent to propane compressor (12) from which it is taken for mixing with fresh waxy feed and reintroduced into the centrifuge.

FIG. 2 graphically represents the relationship between centrifuge bowl speed, bowl diameter, and weir height.

It is a plot of the equation relating centrifuge dimension and speed to the centrifuge force generated for the case if a propane/waxy oil solution of density 0.65 and a pressure drop of 100 psi (i.e. 100 psi at bowl wall, 0 psi at centrifuge axis). The dashed line represents the case where weir height equals bowl radius, (i.e., solid disc) and reflects the physical limitation that the weir height must be less than the bowl radius; weir height must be below the dashed line. The various solid curves represent various bowl speeds (RPM). Each curve shows the relationship between weir height ('Y') and bowl radius ('x') such that the pressure drop ($\Delta P$) between the inside of the bowl (bowl wall) and the center axis is 100 PSI.

The pressure drop of 100 psi and fluid density of 0.65 g/cm$^3$ were chosen as typical values for the propane dewaxing process. Thus, the hot solution feed would enter the centrifuge at e.g. 100 psig and exit at 0 psig.

If, for example, the centrifuge has a bowl radius of 100 cm (diameter=200 cm) and a rotational speed of 500 rpm, then a weir height of 53 cm is needed to give the required pressure drop of 100 psi.

The invention could be practiced with any combination of bowl diameter, bowl speed, and weir height which results in the required pressure drop. It is desirable to minimize diameter and speed (minimize capital cost) and also to maximize weir height (maximize feed rate and minimize chilling rate).

FIG. 2 is a means of visualizing viable combinations of the three variables.

What is claimed is:

1. A method for dewaxing waxy hydrocarbon feeds on a continuous basis using autorefrigerative dewaxing solvents, said method comprising mixing the waxy hydrocarbon with a liquid autorefrigerative solvent to produce a waxy hydrocarbon-autorefrigerative solvent solution, introducing said solution at the wall of a rotating pressure rated centrifuge, continuously adding additional solution into the centrifuge whereby the solution moves from the centrifuge wall to the center axis of the centrifuge and the solvent present in the solution gradually vaporizes in response to the reduction in pressure experienced as the solution moves from the centrifuge wall to the center axis, this vaporization of solvent resulting in the crystallization of wax present in the waxy hydrocarbon in the feed solution, producing a waxliquid hydrocarbon slurry, recovering the vaporized autorefrigerative solvent from the center of the centrifuge for recycling, passing the wax-liquid hydrocarbon slurry over a weir at the mouth of the centrifuge, recovering the slurry and sending it to liquid-solid separation-means for the recovery of wax and dewaxed liquid hydrocarbon.

2. The method of claim 1 wherein the waxy hydrocarbon is a waxy petroleum oil selected from the group consisting of lube oils, refrigerator oils, specialty oils, transformer oils, white oils, turbine oils, insulating oils.

3. The method of claim 1 wherein the centrifuge is additionally fitted with internal weirs.

4. The method of claim 1 wherein the autorefrigerative dewaxing solvent is selected from the group consisting of $C_2$–$C_4$ aliphatic hydrocarbons and mixtures thereof.

5. The method of claim 4 wherein the autorefrigerative dewaxing solvent is selected from the group consisting of propane, butane and mixtures thereof.

6. The method of claim 1 wherein the autorefrigerative solvent to hydrocarbon feed ratio is 1–5 to 1 on a volume basis.

7. The method of claim 1, 2, 3, 4, 5 or 6 wherein the centrifuge rotates at speeds of from about 100 to 2000 rpm.

8. The method of claim 1, 2, 3, 4, 5 or 6 wherein the centrifuge has a bowl diameter in the range 10 to 1000 cm.

9. The method of claim 1 wherein a series of centrifuges is employed with the wax-liquid hydrocarbon slurry passing over the weir of the first or preceding centrifuge being sent as feed to the next succeeding centrifuge.

10. The process of claim 1 wherein the autorefrigerative dewaxing solvent is propane and the centrifuge has a bowl diameter of about 200 cm, the centrifuge rotates at about 500 rpm and the overflow weir has a height of about 53 cm.

* * * * *